(12) United States Patent
Vasseur (10) Patent No.: US 9,306,831 B2
(45) Date of Patent: Apr. 5, 2016

(54) TECHNIQUE FOR EFFICIENT LOAD BALANCING OF TE-LSPS

(75) Inventor: Jean-Philippe Vasseur, Dunstable, MA (US)

(73) Assignee: Cisco Technology, Inc., San Jose, CA (US)

(*) Notice: Subject to any disclaimer, the term of this patent is extended or adjusted under 35 U.S.C. 154(b) by 2580 days.

(21) Appl. No.: 11/057,641

(22) Filed: Feb. 14, 2005

(65) Prior Publication Data

US 2006/0182035 A1 Aug. 17, 2006

(51) Int. Cl.
| | |
|---|---|
| *H04L 12/26* | (2006.01) |
| *G06F 15/173* | (2006.01) |
| *H04L 12/701* | (2013.01) |
| *H04L 12/707* | (2013.01) |
| *H04L 12/723* | (2013.01) |

(52) U.S. Cl.
CPC ............. *H04L 45/00* (2013.01); *H04L 45/24* (2013.01); *H04L 45/502* (2013.01)

(58) Field of Classification Search
USPC .............. 370/230.1, 231, 235, 238, 237, 400, 370/401, 252, 253, 236, 227; 709/233; 379/221.01
See application file for complete search history.

(56) References Cited

U.S. PATENT DOCUMENTS

| | | | |
|---|---|---|---|
| 5,802,286 A * | 9/1998 | Dere et al. .................... | 709/220 |
| 6,111,877 A | 8/2000 | Wilford et al. | |
| 6,282,170 B1 * | 8/2001 | Bentall et al. ................. | 370/225 |
| 6,407,985 B1 | 6/2002 | Jain | |
| 6,438,133 B1 | 8/2002 | Ervin et al. | |
| 6,442,165 B1 | 8/2002 | Sitaraman et al. | |
| 6,473,424 B1 | 10/2002 | DeJager et al. | |
| 6,487,170 B1 * | 11/2002 | Chen et al. .................... | 370/231 |
| 6,603,765 B1 | 8/2003 | Wilford et al. | |
| 6,628,649 B1 | 9/2003 | Raj et al. | |
| 6,633,544 B1 * | 10/2003 | Rexford et al. ............... | 370/238 |
| 6,665,273 B1 * | 12/2003 | Goguen et al. ............... | 370/252 |
| 6,667,975 B1 | 12/2003 | Dejager et al. | |
| 6,731,739 B2 * | 5/2004 | Riihinen et al. ......... | 379/221.01 |
| 6,742,044 B1 | 5/2004 | Aviani et al. | |
| 6,751,190 B1 | 6/2004 | Swallow | |

(Continued)

OTHER PUBLICATIONS

Vasseur et al. draft-vasseur-mpls-loose-path-reopt-02.txt.*

(Continued)

*Primary Examiner* — Marsh D Banks Harold
*Assistant Examiner* — Christopher Wyllie
(74) *Attorney, Agent, or Firm* — Novak Druce Connolly Bove + Quigg LLP (57) ABSTRACT

A technique efficiently load balances traffic engineering (TE) label switched paths (LSPs) from a head-end node to a tail-end node of a computer network. The novel load balancing technique identifies (e.g., at the head-end node or a path computation element, PCE) a set of paths with equal costs from the head-end node to the tail-end node, where each path of the set is composed of one or more associated links. "Link values" such as, e.g., the number of unconstrained TE-LSPs on the link, the amount of available bandwidth on the link, or the percent of total available bandwidth already in use on the link, are applied to each link of each path. The most restrictive link values (link availability) of each path of the set, such as, e.g., the link with the lowest amount of available bandwidth, etc., are then compared. Upon comparing the link availability, the novel technique load balances established and/or new TE-LSPs from the head-end node to the tail-end node over the set of paths accordingly.

27 Claims, 7 Drawing Sheets

(56) References Cited

U.S. PATENT DOCUMENTS

| | | | |
|---|---|---|---|
| 6,751,191 | B1 | 6/2004 | Kanekar et al. |
| 6,778,492 | B2 | 8/2004 | Charny et al. |
| 6,778,495 | B1 | 8/2004 | Blair |
| 6,789,125 | B1 | 9/2004 | Aviani et al. |
| 6,831,898 | B1 | 12/2004 | Edsall et al. |
| 6,850,486 | B2 | 2/2005 | Saleh et al. |
| 6,853,642 | B1 | 2/2005 | Sitaraman et al. |
| 6,895,441 | B1 * | 5/2005 | Shabtay et al. ............... 709/238 |
| 7,016,313 | B1 * | 3/2006 | Harper ............................ 370/254 |
| 7,136,357 | B2 * | 11/2006 | Soumiya et al. ............... 370/236 |
| 7,248,561 | B2 * | 7/2007 | Ishibashi et al. .............. 370/228 |
| 7,319,700 | B1 * | 1/2008 | Kompella ...................... 370/400 |
| 7,379,428 | B2 * | 5/2008 | Xu et al. ........................ 370/254 |
| 2002/0109879 | A1 * | 8/2002 | Wing So ........................ 359/118 |
| 2002/0196802 | A1 * | 12/2002 | Sakov et al. ................... 370/432 |
| 2003/0126287 | A1 | 7/2003 | Charny et al. |
| 2003/0140165 | A1 * | 7/2003 | Chiu et al. ..................... 709/238 |
| 2003/0233595 | A1 | 12/2003 | Charny et al. |
| 2004/0042473 | A1 * | 3/2004 | Park et al. ...................... 370/408 |
| 2004/0071089 | A1 * | 4/2004 | Bauer et al. .................... 370/238 |
| 2004/0090913 | A1 | 5/2004 | Scudder et al. |
| 2004/0196787 | A1 * | 10/2004 | Wang et al. ............ F02D 33/003 |
| 2004/0196827 | A1 | 10/2004 | Xu et al. |
| 2005/0025179 | A1 | 2/2005 | McLaggan et al. |
| 2005/0262264 | A1 * | 11/2005 | Ando et al. .................... 709/233 |
| 2006/0018326 | A1 * | 1/2006 | Yucel .................. H04L 12/5695 370/397 |
| 2006/0095563 | A1 * | 5/2006 | Benjamin et al. ............. 709/224 |
| 2006/0133282 | A1 * | 6/2006 | Ramasamy .................... 370/238 |

OTHER PUBLICATIONS

Vassuer (Inter-AS MPLS Traffic Engineering—Jun. 2003).*

Rekhter, Y., RFC 1771, entitled A Border Gateway Protocol 4 (BGP-4), Mar. 1995, pp. 1-54.

U.S. Appl. No. 11/052,280, filed Feb. 7, 2005, entitled Inter-Domain Optimization Trigger in PCE-Based Environment, Vasseur et al.

Vasseur, J. P., et al., Network Working Group Internet Draft, entitled RSVP Path Computation Request and Reply Messages (draft-vasseur-mpls-computation-rsvp-05.txt), Jul. 2004, pp. 1-31.

Pan, P. et al., Internet Draft, entitled Fast Reroute Extensions to RSVP-TE for LSP Tunnels (draft-ietf-mpls-rsvp-lsp-fastreroute-07.txt), Feb. 2005, pp. 1-35.

Callon, R., RFC 1195, entitled Use of OSI ISIS for routing in TCP/IP and Dual Environments, Dec. 1990, pp. 1-80.

Braden, R. et al., RFC 2205, entitled Resource ReSerVation Protocol (RSVP), Version 1 Functional Specification, Sep. 1997, pp. 1-112.

Moy, J., RFC 2328, entitled OSPF Version 2, Apr. 1998, pp. 1-183.

Awduche, D. et al., RFC 3209, entitled RSVP-TE: Extensions to RSVP for LSP Tunnels Dec. 2001, pp. 1-43.

Berger, L., RFC 3473, entitled Generalized Multi-Protocol Label Switching (GMPLS) Signaling Resource ReSerVation Protocol—Traffic Engineering (RSVP-TE) Extensions, Jan. 2003, pp. 1-40.

Katz, D. et al., RFC 3630, entitled Traffic Engineering (TE) Extensions to OSPF Version 2, Sep. 2003, pp. 1-14.

Smit, H., RFC 3784, entitled Intermediate-System-to-Intermediate-System (IS-IS) Extensions for Traffic Engineering (TE), Jun. 2004, pp. 1-13.

Mannie, E., RFC 3945, entitled Generalized Multi-Protocol Label Switching (GMPLS) Architecture, Oct. 2004, pp. 1-65.

Mannie, E., RFC 3946, entitled Generalized Multi-Protocol Label Switching (GMPLS) Extensions for Synchronous Optical Network (SONET) and Synchronous Digital Hierarchy (SDH) Control, Oct. 2004, pp. 1-25.

Perlman, Radia, Interconnections Second Edition: Bridges, Routers, Switches, and Internetworking Protocols, Addison Wesley, 1999, Section 12.2.4, pp. 317-319.

* cited by examiner

TECHNIQUE FOR EFFICIENT LOAD BALANCING OF TE-LSPS

BACKGROUND OF THE INVENTION

1. Field of the Invention

The present invention relates to computer networks and more particularly to load balancing Traffic Engineering (TE) label switched paths (LSPs) of a computer network.

2. Background Information

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS or an area is generally referred to as a "domain," and a router that interconnects different domains together is generally referred to as a "border router."

An example of an interdomain routing protocol is the Border Gateway Protocol version 4 (BGP), which performs routing between domains (ASes) by exchanging routing and reachability information among neighboring interdomain routers of the systems. An adjacency is a relationship formed between selected neighboring (peer) routers for the purpose of exchanging routing information messages and abstracting the network topology. The routing information exchanged by BGP peer routers typically includes destination address prefixes, i.e., the portions of destination addresses used by the routing protocol to render routing ("next hop") decisions. Examples of such destination addresses include IP version 4 (IPv4) and version 6 (IPv6) addresses. BGP generally operates over a reliable transport protocol, such as TCP, to establish a TCP connection/session. The BGP protocol is well known and generally described in Request for Comments (RFC) 1771, entitled *A Border Gateway Protocol 4 (BGP-4)*, published March 1995.

Examples of an intradomain routing protocol, or an interior gateway protocol (IGP), are the Open Shortest Path First (OSPF) routing protocol and the Intermediate-System-to-Intermediate-System (IS-IS) routing protocol. The OSPF and IS-IS protocols are based on link-state technology and, therefore, are commonly referred to as link-state routing protocols. Link-state protocols define the manner with which routing information and network-topology information are exchanged and processed in a domain. This information is generally directed to an intradomain router's local state (e.g., the router's usable interfaces and reachable neighbors or adjacencies). The OSPF protocol is described in RFC 2328, entitled *OSPF Version 2*, dated April 1998 and the IS-IS protocol used in the context of IP is described in RFC 1195, entitled *Use of OSI IS-IS for routing in TCP/IP and Dual Environments*, dated December 1990, both of which are hereby incorporated by reference.

An intermediate network node often stores its routing information in a routing table maintained and managed by a routing information base (RIB). The routing table is a searchable data structure in which network addresses are mapped to their associated routing information. However, those skilled in the art will understand that the routing table need not be organized as a table, and alternatively may be another type of searchable data structure. Although the intermediate network node's routing table may be configured with a predetermined set of routing information, the node also may dynamically acquire ("learn") network routing information as it sends and receives data packets. When a packet is received at the intermediate network node, the packet's destination address may be used to identify a routing table entry containing routing information associated with the received packet. Among other things, the packet's routing information indicates the packet's next-hop address.

To ensure that its routing table contains up-to-date routing information, the intermediate network node may cooperate with other intermediate nodes to disseminate routing information representative of the current network topology. For example, suppose the intermediate network node detects that one of its neighboring nodes (i.e., adjacent network nodes) becomes unavailable, e.g., due to a link failure or the neighboring node going "off-line," etc. In this situation, the intermediate network node can update the routing information stored in its routing table to ensure that data packets are not routed to the unavailable network node. Furthermore, the intermediate node also may communicate this change in network topology to the other intermediate network nodes so they, too, can update their local routing tables and bypass the unavailable node. In this manner, each of the intermediate network nodes becomes "aware" of the change in topology.

Typically, routing information is disseminated among the intermediate network nodes in accordance with a predetermined network communication protocol, such as a link-state protocol (e.g., IS-IS, or OSPF). Conventional link-state protocols use link-state advertisements or link-state packets (or "IGP Advertisements") for exchanging routing information between interconnected intermediate network nodes (IGP nodes). As used herein, an IGP Advertisement generally describes any message used by an IGP routing protocol for communicating routing information among interconnected IGP nodes, i.e., routers and switches. Operationally, a first IGP node may generate an IGP Advertisement and "flood" (i.e., transmit) the packet over each of its network interfaces coupled to other IGP nodes. Thereafter, a second IGP node may receive the flooded IGP Advertisement and update its routing table based on routing information contained in the received IGP Advertisement. Next, the second IGP node may flood the received IGP Advertisement over each of its network interfaces, except for the interface at which the IGP Advertisement was received. This flooding process may be repeated until each interconnected IGP node has received the IGP Advertisement and updated its local routing table.

In practice, each IGP node typically generates and disseminates an IGP Advertisement whose routing information includes a list of the intermediate node's neighboring network nodes and one or more "cost" values associated with each neighbor. As used herein, a cost value associated with a neighboring node is an arbitrary metric used to determine the relative ease/burden of communicating with that node. For instance, the cost value may be measured in terms of the number of hops required to reach the neighboring node, the average time for a packet to reach the neighboring node, the amount of network traffic or available bandwidth over a communication link coupled to the neighboring node, etc.

As noted, IGP Advertisements are usually flooded until each intermediate network IGP node has received an IGP Advertisement from each of the other interconnected intermediate nodes. Then, each of the IGP nodes (e.g., in a link-state protocol) can construct the same "view" of the network topology by aggregating the received lists of neighboring nodes and cost values. To that end, each IGP node may input this received routing information to a "shortest path first" (SPF) calculation that determines the lowest-cost network paths that couple the intermediate node with each of the other network nodes. For example, the Dijkstra algorithm is a conventional technique for performing such an SPF calculation, as described in more detail in Section 12.2.4 of the text book *Interconnections Second Edition*, by Radia Perlman, published September 1999, which is hereby incorporated by reference as though fully set forth herein. Each IGP node updates the routing information stored in its local routing table based on the results of its SPF calculation. More specifically, the RIB updates the routing table to correlate destination nodes with next-hop interfaces associated with the lowest-cost paths to reach those nodes, as determined by the SPF calculation.

Multi-Protocol Label Switching (MPLS) Traffic Engineering has been developed to meet data networking requirements such as guaranteed available bandwidth or fast restoration. MPLS Traffic Engineering exploits modern label switching techniques to build guaranteed bandwidth end-to-end tunnels through an IP/MPLS network of label switched routers (LSRs). These tunnels are a type of label switched path (LSP) and thus are generally referred to as MPLS Traffic Engineering (TE) LSPs. Examples of MPLS TE can be found in RFC 3209, entitled *RSVP-TE: Extensions to RSVP for LSP Tunnels* dated December 2001, RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version 2* dated September 2003, the contents of all of which are hereby incorporated by reference in their entirety.

Establishment of an MPLS TE-LSP from a head-end LSR to a tail-end LSR involves computation of a path through a network of LSRs. Optimally, the computed path is the "shortest" path, as measured in some metric, that satisfies all relevant LSP Traffic Engineering constraints such as e.g., required bandwidth, "affinities" (administrative constraints to avoid or include certain links), etc. Notably, a TE-LSP with constraints is referred to as a "constrained TE-LSP." Path computation can either be performed by the head-end LSR or by some other entity operating as a path computation element (PCE) not co-located on the head-end LSR. The head-end LSR (or a PCE) exploits its knowledge of network topology and resources available on each link to perform the path computation according to the LSP Traffic Engineering constraints. Various path computation methodologies are available including CSPF (constrained shortest path first). MPLS TE-LSPs can be configured within a single domain, e.g., area, level, or AS, or may also span multiple domains, e.g., areas, levels, or ASes.

The PCE is an entity having the capability to compute paths between any nodes of which the PCE is aware in an AS or area. PCEs are especially useful in that they are more cognizant of network traffic and path selection within their AS or area, and thus may be used for more optimal path computation. A head-end LSR may further operate as a path computation client (PCC) configured to send a path computation request to the PCE, and receive a response with the computed path, which potentially takes into consideration other path computation requests from other PCCs. It is important to note that when one PCE sends a request to another PCE, it acts as a PCC.

Some applications may incorporate unidirectional data flows configured to transfer time-sensitive traffic from a source (sender) in a computer network to a destination (receiver) in the network in accordance with a certain "quality of service" (QoS). Here, network resources may be reserved for the unidirectional flow to ensure that the QoS associated with the data flow is maintained. The Resource ReSerVation Protocol (RSVP) is a network-control protocol that enables applications to reserve resources in order to obtain special QoS for their data flows. RSVP works in conjunction with routing protocols to, e.g., reserve resources for a data flow in a computer network in order to establish a level of QoS required by the data flow. RSVP is defined in R. Braden, et al., *Resource ReSerVation Protocol (RSVP)*, RFC 2205. In the case of traffic engineering applications, RSVP signaling is used to establish a TE-LSP and to convey various TE-LSP attributes to routers, such as border routers, along the TE-LSP obeying the set of required constraints whose path may have been computed by various means.

In certain network configurations, such as, e.g., symmetric networks, multiple paths may exist that have equal costs between a source node and a destination node (or in MPLS TE, between a head-end node and a tail-end node). An example of a symmetric network is a network including a core system of routers, generally large capacity routers, interconnecting one or more edge devices (edge routers) at equal costs from the core. Known equal-cost multi-path (ECMP) routing techniques may be used to route packets along the multiple paths of equal cost in a symmetric network. One such ECMP technique distributes traffic from the source to the destination substantially evenly across the multiple equal-cost paths so that no single path (e.g., network element or link along the path) is overwhelmed, i.e., to essentially "load balance" the traffic across the paths. An illustrative load balancing technique applies a "round-robin" algorithm that cycles distribution of traffic (e.g., IP packets or new TE-LSPs) from one path to the next in such a way (e.g., ordered or random) that each path receives substantially equal amounts of traffic. For example, if there are two possible paths, a first TE-LSP is established over the first path, a second TE-LSP is established over the second path, a third TE-LSP is established over the first path, etc. While this technique is effective, it is less than efficient at considering TE-LSPs or other traffic already traversing the possible paths, such as from other head-end nodes or routers. Other load balancing techniques that do account for network configurations (e.g., available bandwidth of the paths) are available, as known to those skilled in the art.

Occasionally, a network element (e.g., a node or link) will fail, causing redirection of the traffic that originally traversed the failed network element to other network elements that bypass the failure. Generally, notice of this failure is relayed to the nodes in the same domain through an advertisement of the new network topology, e.g., an IGP Advertisement, and routing tables are updated to avoid the failure accordingly. Typically, both IP traffic and any TE-LSPs are redirected to avoid a failure in a manner known to those skilled in the art.

To obviate delays associated with updating routing tables when attempting to avoid a failed network element (i.e., during convergence), some networks have employed MPLS TE fast reroute (FRR). MPLS FRR is a technique that may be used to quickly reroute traffic around failed network elements in a TE-LSP. MPLS FRR is further described, for example, by P. Pan, et al., in *Fast Reroute Extensions to RSVP-TE for LSP Tunnels* <draft-ietf-mpls-rsvp-lsp-fastreroute-07. txt>, available from the Internet Engineering Task Force (IETF). According to the technique, one or more links in a primary path are protected links (i.e., they are protected by an alternate path). If a failure occurs on a protected link or node, TE-LSPs (and consequently the traffic that they carry) are locally rerouted onto an appropriate alternate path (e.g., a "backup tunnel") by the node immediately upstream from the failure. The backup tunnel acts as an FRR path for the primary TE-LSP and obviates delays associated with other measures, such as tearing down the primary TE-LSP after having gracefully rerouted the TE-LSPs affected by the failure, should an alternate path around the failed network element exist. Notably, in some situations (e.g., where MPLS Traffic Engineering is used for the sole purpose of FRR), networks may establish "unconstrained TE-LSPs" for traffic not conventionally contained within constrained TE-LSPs (e.g., IP traffic). An unconstrained TE-LSP is a TE-LSP that has no constraints or affinities (i.e., reserves no bandwidth), and is used generally to supply MPLS TE features to traversing traffic.

Generally, a local FRR may be followed by an optimization in order to force the traffic to follow a more optimal TE-LSP. For example, assume a head-end node has first and second equal-cost paths for TE-LSPs to a tail end node, each with FRR protection. In the event a TE-LSP on the first path has a failure and local FRR is performed (e.g., rerouting the TE-LSP to a backup tunnel, in some cases with a higher cost than the original failed path), the head-end node may later optimize the locally rerouted TE-LSP to traverse the second equal-cost path. Once the failed network element is restored (an "event"), a notification (e.g., an IGP Advertisement) is sent to the surrounding domain so the network can potentially redirect the traffic over the more optimal route (i.e., "re-optimize"). Notably, several known "triggers" (e.g., a timer or an event-driven trigger) can be used to initiate the optimization of a TE-LSP. Moreover, establishing a new TE-LSP and re-optimizing an established TE-LSP are generally referred to herein as "optimizing" a TE-LSP.

One problem with optimizing TE-LSPs, e.g., after FRR, is that for networks with multiple equal-cost paths, the rerouted TE-LSPs generally do not revert to the previous path since that path is no more optimal than the current rerouted path (i.e., they have the same cost). This situation reduces the ability of networks to balance the traffic (load) over the equal-cost paths. Particularly, however, in the case where unconstrained TE-LSPs are utilized, there is currently no method for signifying the number of unconstrained TE-LSPs that traverse a particular path (i.e., links of the path). Even if the unconstrained TE-LSPs had been load balanced previously (e.g., before FRR), there is currently no method for returning the unconstrained TE-LSPs to their load balanced state, resulting in undesirable asymmetrical traffic routing. There remains a need, therefore, for a technique that efficiently load balances TE-LSPs, particularly unconstrained TE-LSPs. There also remains a need for a technique that efficiently load balances TE-LSPs after having been rerouted from a previously load balanced equal-cost path.

SUMMARY OF THE INVENTION

The present invention is directed to a technique for efficiently load balancing traffic engineering (TE) label switched paths (LSPs) from a head-end node to a tail-end node of a computer network. The novel load balancing technique identifies (e.g., at the head-end node or a path computation element, PCE) a set of paths with equal costs from the head-end node to the tail-end node, where each path of the set is composed of one or more associated links. "Link values" such as, e.g., the number of unconstrained TE-LSPs on the link, the amount of available bandwidth on the link, or the percent of total available bandwidth already in use on the link, are applied to each link of each path. The most restrictive link values (signifying the availability of the link to receive TE-LSPs, or "link availability") of each path of the set, such as, e.g., the link with the lowest amount of available bandwidth, etc., are then compared. Upon comparing the link availability, the novel technique load balances established and/or new TE-LSPs from the head-end node to the tail-end node over the set of paths accordingly.

In the illustrative embodiment described herein, the link values are transmitted using Interior Gateway Protocol (IGP) messages. IGP nodes of the network (e.g., label switched routers, LSRs) may create an IGP message that is used to propagate ("advertise") the link values to other LSRs or PCEs in its domain, e.g., its IGP area/level. The IGP message is illustratively embodied as an Open Shortest Path First (OSPF) or Intermediate-System-to-Intermediate-System (IS-IS) advertisement message ("IGP Advertisement"), respectively. Notably, the IGP Advertisement includes a type/length/value (TLV) encoded format used to convey the link values.

In accordance with one aspect of the present invention, upon receiving a trigger (e.g., timer or event based) to optimize TE-LSPs, the LSR identifies for each of its TE-LSPs a set of available equal-cost paths to the tail-end node of that TE-LSP, where each path is composed of one or more links. The LSR then determines the link values learned, e.g., from IGP Advertisements, for each link along each path signifying the link availability. Once each link value is determined, the LSR compares the links having the least availability on each path to those of each other path and, if necessary, reroutes (or routes) the TE-LSP over the path with more link availability (e.g., by a configurable amount), thereby load balancing the TE-LSPs.

Advantageously, the novel technique efficiently load balances TE-LSPs, including unconstrained TE-LSPs, over multiple paths from a head-end node to a tail-end node based on the link availability (most restrictive link value) of each link along the multiple paths. By comparing the link availability of each path, the inventive technique provides a mechanism for efficiently load balancing the TE-LSPs across equal-cost paths. This is particularly advantageous in the case where previously load balanced TE-LSPs have been rerouted due to a network element failure, and optimizing those rerouted TE-LSPs when the network element is restored, strictly based on path cost, would not result in a reversion to the previous, e.g., load balanced, path.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

Figure 1:
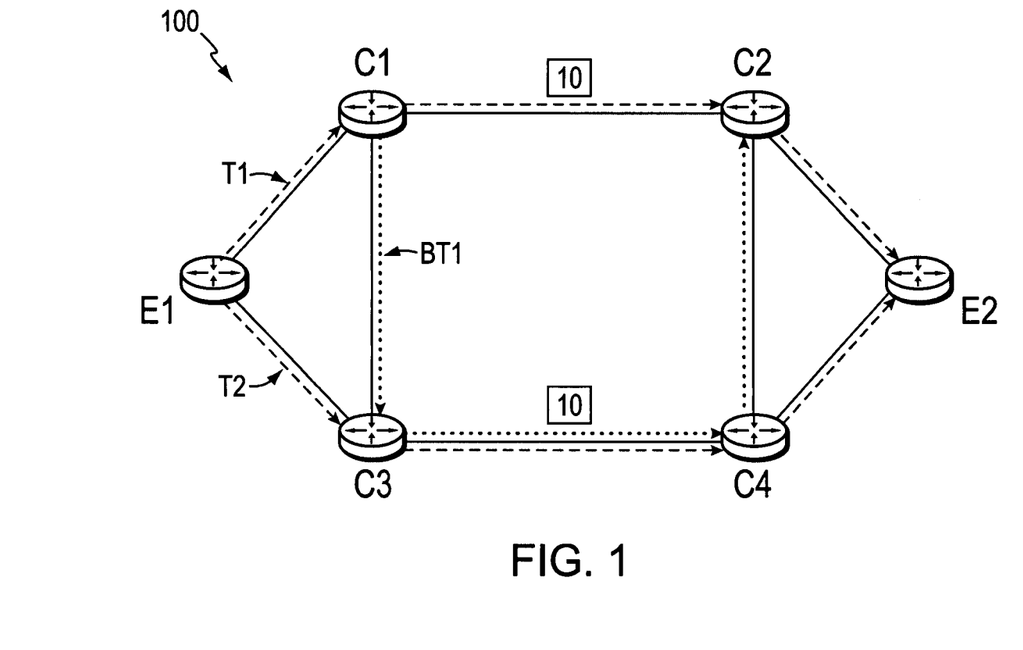
FIG. 1 is a schematic block diagram of an exemplary computer network that may be used in accordance with the present invention.

FIG. 1 is a schematic block diagram of an exemplary computer network 100 comprising edge devices (edge routers) E1 and E2 interconnected by core routers C1-C4 (e.g., through links as shown). A core router is generally defined as a router that is part of a core or "backbone" (i.e., the collection of core routers C1-C4) that serves as a single "pipe" through which all traffic from peripheral networks must pass on its way to other peripheral networks. Because of this, the core routers (and the links connecting them) are commonly designed to accommodate a high volume of traffic, such as, e.g., links with 2.5 GB (gigabytes) or 10 GB of bandwidth (such as optical connections OC48 or OC192, respectively). The edge routers E1 and E2 may connect to the peripheral networks (not shown), acting as access points (points of presence, POP) to the computer network for other devices of the peripheral network. Notably, the core may be organized as a meshed network, in which the devices are organized in a manageable, segmented manner known to those skilled in the art. Moreover, each edge router (E1 and E2) may be connected to multiple core routers (e.g., in a "mesh" fashion), providing redundancy for each edge router to the core. Assume that each link in the computer network 100 has a cost value of 1, unless otherwise noted. Particularly, links C1-C2 and C3-C4 have costs (in boxes) of 10. Those skilled in the art will understand that any number of routers and nodes may be used in the computer network, and that the view shown herein is for simplicity. For example, more edge routers may be connected to the core system (core routers C1-C4) in a manner similar to E1 and E2, e.g., with mesh connections to the core.

Data packets may be exchanged among the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing information may be distributed among the routers of the computer network using predetermined IGPs, such as conventional distance-vector protocols or, illustratively, link-state protocols, through the use of IGP Advertisements.

Figure 2:
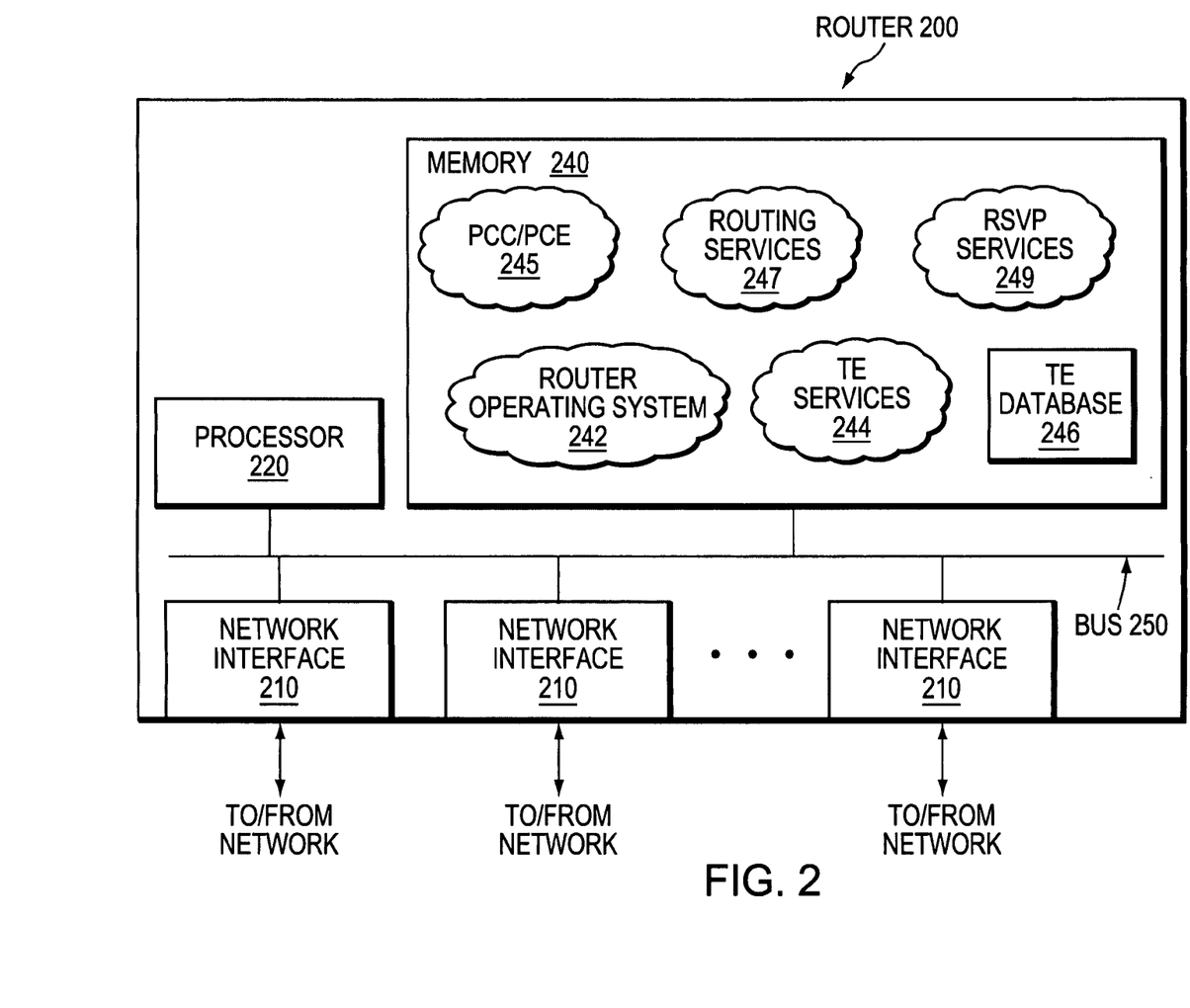
FIG. 2 is schematic block diagram of an exemplary router that may be advantageously used with the present invention.

FIG. 2 is a schematic block diagram of an exemplary router 200 that may be advantageously used with the present invention as an edge router or a core router. The router comprises a plurality of network interfaces 210, a processor 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as TE Database (TED) 246. A router operating system 242, portions of which is typically resident in memory 240 and executed by the processor, functionally organizes the router by, inter alia, invoking network operations in support of software processes and/or services executing on the router. These software processes and/or services include PCC/PCE process 245, routing services 247, TE services 244, and RSVP services 249. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as IGP, e.g., OSPF and IS-IS. These functions may be configured to manage a forwarding information database (not shown) containing, e.g., data used to make forwarding decisions. RSVP services 249 contain computer executable instructions for implementing RSVP and processing RSVP messages in accordance with the present invention. RSVP is described in RFC 2205, entitled *Resource ReSerVation Protocol (RSVP)*, and in RFC 3209, entitled *RSVP-TE: Extensions to RSVP for LSP Tunnels*, both as incorporated above.

TE services 244 contain computer executable instructions for operating TE functions in accordance with the present invention. Examples of Traffic Engineering are described in RFC 3209, RFC 3784, and RFC 3630 as incorporated above, and in RFC 3473, entitled, *Generalized Multi-Protocol Label Switching (GMPLS) Signaling Resource ReSerVation Protocol-Traffic Engineering (RSVP-TE) Extensions* dated January 2003, which is hereby incorporated by reference in its entirety. TED 246 is illustratively resident in memory 240 and used to store TE information provided by the routing protocols, such as IGP (with TE extensions, e.g., as described herein), including, inter alia, "link values" as described herein. The TED 246 is illustratively maintained and managed by TE services 244.

Changes in the network topology may be communicated among routers 200 using a link-state protocol, such as the conventional OSPF and IS-IS protocols. Suppose, for example, that a communication link fails or a cost value associated with a network node changes. Once the change in the network's state is detected by one of the routers, that router may flood an IGP Advertisement communicating the change to the other routers in the network. In this manner, each of the routers eventually "converges" to an identical view of the network topology.

Figure 3:
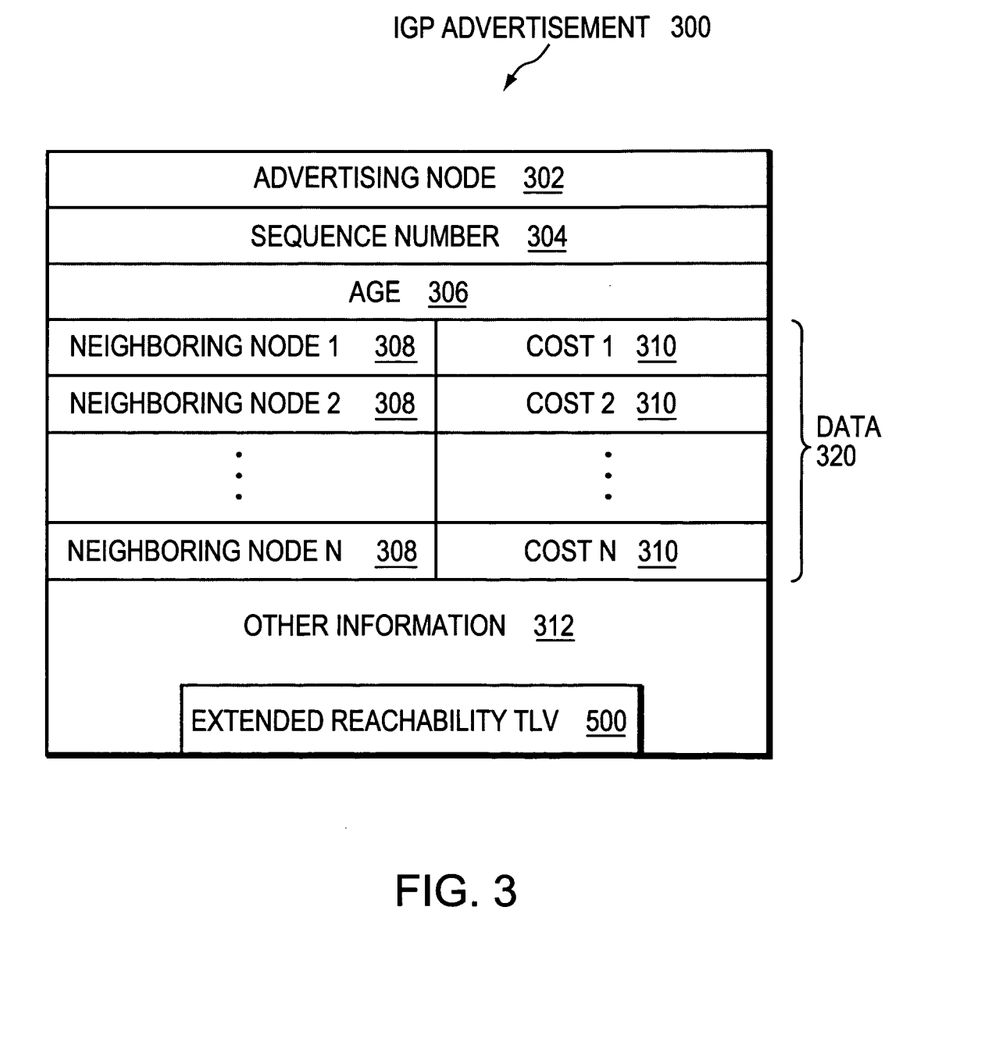
FIG. 3 is a schematic block diagram of an exemplary IGP Advertisement that may be flooded by the routers.

FIG. 3 illustrates an exemplary IGP Advertisement 300 that may be flooded by the routers 200. The packet includes an advertising-node field 302, a sequence-number field 304, an age field 306, a data section 320, and other routing information 312. The advertising-node field 302 stores a value that identifies the router that generated and originally broadcast the IGP Advertisement 300. The sequence-number field 304 stores a sequence number indicating the relative version of the IGP Advertisement. Typically, the sequence number stored in the field 304 is incremented, e.g., by one, for every new version of the IGP Advertisement. The IGP Advertisement 300 is therefore considered "stale" (invalid) if its sequence number is less than the sequence number stored in a previously-received version of the IGP Advertisement, i.e., generated by the same advertising node. Accordingly, the routers 200 may be configured to store and forward only the most recent version of an IGP Advertisement, e.g., the version having the largest sequence number.

The age field 306 also stores a value that may be used for determining whether the IGP Advertisement 300 is valid. The age value is typically initialized to a non-zero integer value, often in units of seconds. The age value may be decremented, e.g., by one every second, until the age value reaches zero, thereby indicating that the IGP Advertisement has become invalid. That is, every router 200 that stores or floods the IGP Advertisement 300 continuously ages the packet until the age value equals zero. Those skilled in the art will appreciate that other aging mechanisms alternatively may be used, such as incrementing the IGP Advertisement age value from an initial value, e.g., equal to zero, until the age value reaches a known upper limit.

Figure 5:
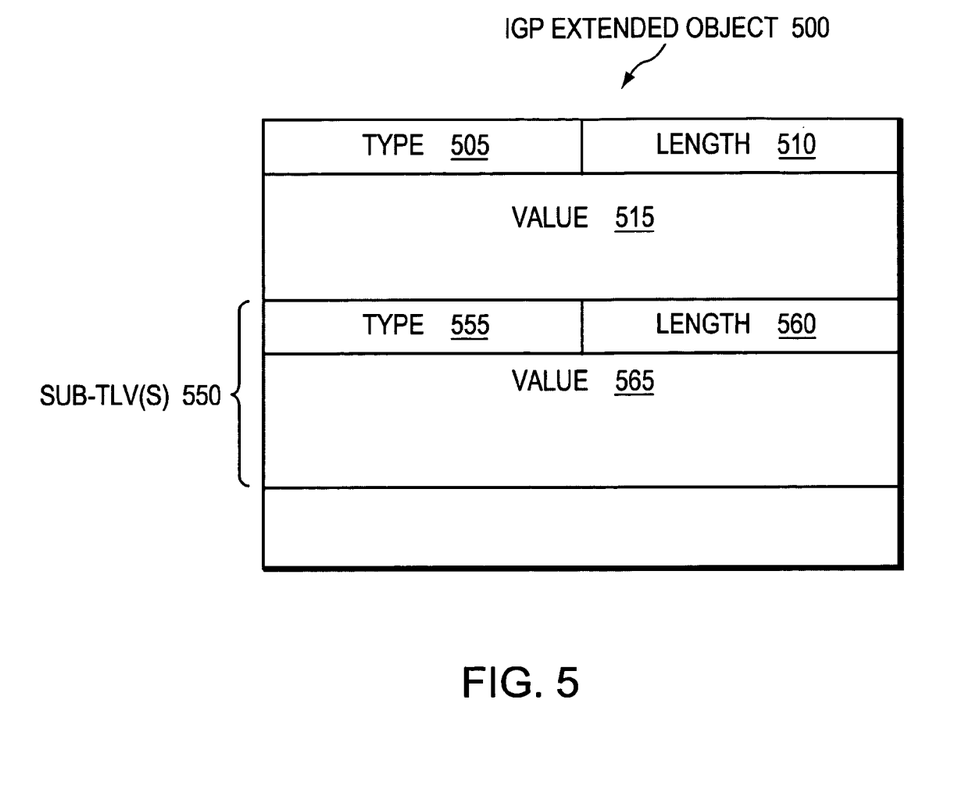
FIG. 5 is a schematic block diagram illustrating the format of an IGP Extension Object that may be advantageously used with the present invention.

The data section 320 includes one or more pairs of neighboring-node fields 308 and cost fields 310. Each neighboring-node field 308 stores a value, such as an address, indicating a network node that is directly accessible from the intermediate node stored in the advertising-node field 302. The field 310 stores a cost value that has been associated, e.g., by the advertising node, with the network node identified in the neighboring-node field 308. As shown, each neighboring-node field 308 is associated with only one corresponding cost field 310. However, it is noted that in other embodiments, a single neighboring node may be associated with a plurality of cost values. Other routing information 312 may also be included in the IGP Advertisement 300, such as checksum values, packet-length information, flag values, type-of-service metrics, etc., and/or an IGP Extension Object 500 (described further below). Generally, the received IGP Advertisements are stored in a Link-State Database (LSDB) of the router 200 (not shown).

In one embodiment, the routers described herein are IP routers that implement Multi-Protocol Label Switching (MPLS) and operate as label switched routers (LSRs). In one simple MPLS scenario, at an ingress to a network, a label is assigned to each incoming packet based on its forwarding equivalence class before forwarding the packet to a next-hop router. At each router, a forwarding selection and a new substitute label are determined by using the label found in the incoming packet as a reference to a label forwarding table that includes this information. At the network egress (or one hop prior), a forwarding decision is made based on the incoming label but optionally no label is included when the packet is sent on to the next hop.

The paths taken by packets that traverse the network in this manner are referred to as label switched paths (LSPs) or Traffic Engineering (TE)-LSPs. An example TE-LSP is shown as the dashed lines and arrows (T1) between a head-end node (E1) and a tail-end node (E2) in FIG. 1. Establishment of a TE-LSP requires computation of a path, signaling along the path, and modification of forwarding tables along the path. MPLS TE establishes LSPs that have guaranteed bandwidth under certain conditions. Notably, unconstrained TE-LSPs do not require any reserved bandwidth, as described herein. Illustratively, the TE-LSPs may be signaled through the use of the RSVP protocol, and in particular, RSVP TE signaling messages. Notably, when incorporating the use of PCEs, the path computation request (and response) between PCC and PCE can be exchanged in accordance with a protocol specified in Vasseur, et al. *RSVP Path Computation Request and Reply Messages*, Internet Draft, July 2004, which is hereby incorporated by reference as though fully set forth herein. It should be understood that the use of RSVP serves only as an example, and that other communication protocols may be used in accordance with the present invention.

Although the illustrative embodiment described herein is directed to MPLS, it should also be noted that the present invention may advantageously apply to Generalized MPLS (GMPLS), which pertains not only to packet and cell-based networks, but also to Time Division Multiplexed (TDM) and optical networks. GMPLS is well known and described in RFC 3945, entitled *Generalized Multi-Protocol Label Switching (GMPLS) Architecture*, dated October 2004, and RFC 3946, entitled *Generalized Multi-Protocol Label Switching (GMPLS) Extensions for Synchronous Optical Network (SONET) and Synchronous Digital Hierarchy (SDH) Control*, dated October 2004, the contents of both of which are hereby incorporated by reference in their entirety.

MPLS TE fast reroute (FRR) is a technique that may be used to quickly reroute TE LSPs (and consequently the traffic that they carry) around failed network elements in a TE-LSP. According to the technique, one or more links in the primary path are protected links (i.e., they are protected by an alternate path). Referring back to FIG. 1, for example, assume that computer network 100 is embodied as an MPLS TE computer network having a set of TE-LSPs (traversing primary paths) between each edge router. For instance, edge router E1 has a first TE-LSP T1 to E2 via a first path (through C1 and C2) and a second TE-LSP T2 to E2 via a second path (through C3 and C4). These TE-LSPs may be either constrained (e.g., reserving bandwidth) or unconstrained (e.g., reserving no bandwidth), and may be used for any number of known purposes, including, e.g., load balancing, redundancy, etc. Notably, T1 and T2 traverse equal-cost paths from E1 to E2 (cost of each computed as 1+10+1, or 12), also known as a "symmetric" network. Illustratively, the protected link shown is link C1-C2 for the path that T1 traverses. The alternate path for link C1-C2 (backup tunnel BT1) follows a path around the core that avoids the protected link C1-C2 (e.g., by traveling links C1-C3-C4-C2). This backup tunnel may be embodied as a TE-LSP, and is typically stored within the memory 240 of C1. Those skilled in the art will understand that other backup tunnels may be implemented to protect other links, and that the view shown here is for the sake of illustration and simplicity.

Figure 4A:
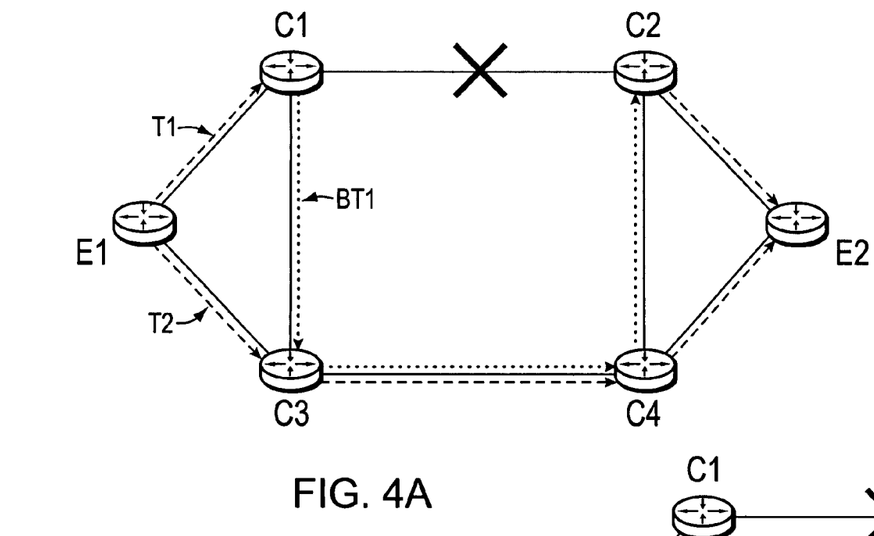
FIG. 4A is a schematic block diagram of the exemplary computer network in FIG. 1 employing a backup tunnel with MPLS FRR.
Figure 4B:
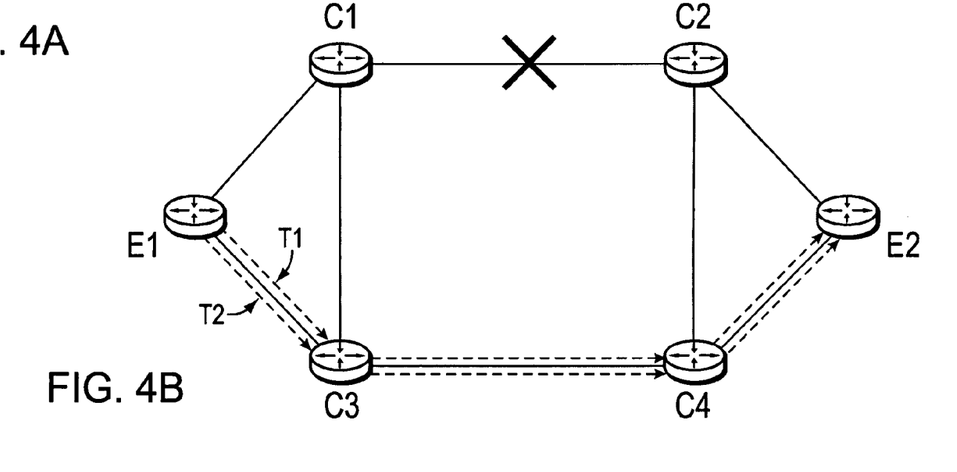
FIG. 4B is a schematic block diagram of the exemplary computer network in FIG. 4A with optimized TE-LSPs after MPLS FRR.

If a failure occurs on the protected link C1-C2, core router C1 detects the failure and locally reroutes T1 onto the appropriate backup tunnel BT1, such as by inserting a new label for BT1 onto labeled packets received for T1. FIG. 4A is a schematic block diagram of the exemplary computer network in FIG. 1 employing a backup tunnel with MPLS FRR. Because C1 quickly directs traffic for T1 over the backup tunnel BT1, delays associated with other measures are obviated, such as, e.g., having E1 tear down T1 and establish a new TE-LSP around the failed network element. After traffic is quickly rerouted over BT1, E1 may later initiate an optimization in order to cause the traffic over T1 to follow a more optimal TE-LSP. FIG. 4B is a schematic block diagram of the exemplary computer network in FIG. 4A with optimized TE-LSPs after MPLS FRR. For example, once triggered to optimize TE-LSPs (e.g., by a timer, event, or other notification from C1), E1 computes an SPF from E1 to E2 without the failed link C1-C2. Because the cost of the current rerouted path through BT1 equals 14 (1+1+10+1+1), E1 establishes an optimized TE-LSP for T1 across the shortest path (currently followed by T2 on an equal-cost path) at the original cost of 12.

The present invention is directed to a technique for efficiently load balancing traffic engineering (TE) label switched paths (LSPs) from a head-end node to a tail-end node of a computer network. The novel load balancing technique identifies (e.g., at the head-end node or a path computation element, PCE) a set of paths with equal costs from the head-end node to the tail-end node, where each path of the set is composed of one or more associated links. "Link values" such as, e.g., the number of unconstrained TE-LSPs on the link, the amount of available bandwidth on the link, or the percent of total available bandwidth already in use on the link, are applied to each link of each path. The most restrictive link values (signifying the availability of the link to receive TE-LSPs, or "link availability") of each path of the set such as, e.g., the link with the lowest amount of available bandwidth, etc., are then compared. Upon comparing the link availability, the novel technique load balances established and/or new TE-LSPs from the head-end node to the tail-end node over the set of paths accordingly.

In the illustrative embodiment described herein, the link values are transmitted using IGP messages. IGP nodes of the network (e.g., LSRs) may create an IGP message that is used to propagate ("advertise") the link values to other LSRs or PCEs in its domain, e.g., its IGP area/level. The IGP message is illustratively embodied as an Open Shortest Path First (OSPF) or Intermediate-System-to-Intermediate-System (IS-IS) advertisement message ("IGP Advertisement 300"), respectively. Notably, the IGP Advertisement includes a type/length/value (TLV) encoded format used to convey the link values, such as IGP Extension Object 500. FIG. 5 is a schematic block diagram illustrating an IGP Extension Object 500 encoded using a TLV that may be advantageously used with the present invention. The TLV encoding format is a general way to communicate information between nodes, such as routers. The TLV "attribute" 500 is used to identify a type (T) of information being communicated (conveyed), a length (L) of information to be conveyed and a value (V) of the actual information conveyed. The length (L) parameter contained in the length field 510 is typically implementation-specific and can denote the length from the beginning of the Type field 505 of the attribute 500 to the end. However, the length generally denotes the length of the Value (V) field 515 and not the Type (T) or Length (L) fields. The TLV encoded format may also comprise one or more non-ordered sub-TLVs 550 carried within the TLV "payload" (e.g. Value field 515), each having a Type field 555, Length field 560, and Value field 565. The fields of the sub-TLV(s) 550 are used in a variety of manners, including as described herein, according to the present invention.

In accordance with one aspect of the present invention, upon receiving a trigger (e.g., timer or event based) to optimize TE-LSPs, the LSR identifies for each of its TE-LSPs a set of available equal-cost paths to the tail-end node of that TE-LSP, where each path is composed of one or more links. The timer-based trigger uses a configurable duration of time between optimizations, such as, e.g., once every hour, day, week, etc. The event-driven trigger, on the other hand, attempts to optimize a TE-LSP upon the detection of certain events, such as the restoration of a link (e.g., the previously unavailable link C1-C2). Illustratively, the LSR learns of the network event through conventional notification means, e.g., an IGP Advertisement, or through other notification means. Examples of other notification means and optimization triggers (inter-domain) that may be used with the present invention are described in commonly-owned copending U.S. patent application Ser. No. 11/052,280, entitled INTERDOMAIN OPTIMIZATION TRIGGER IN PCE-BASED ENVIRONMENT, filed by Vasseur et al., on Feb. 7, 2005, the contents of which are hereby incorporated by reference in its entirety.

Figure 6:
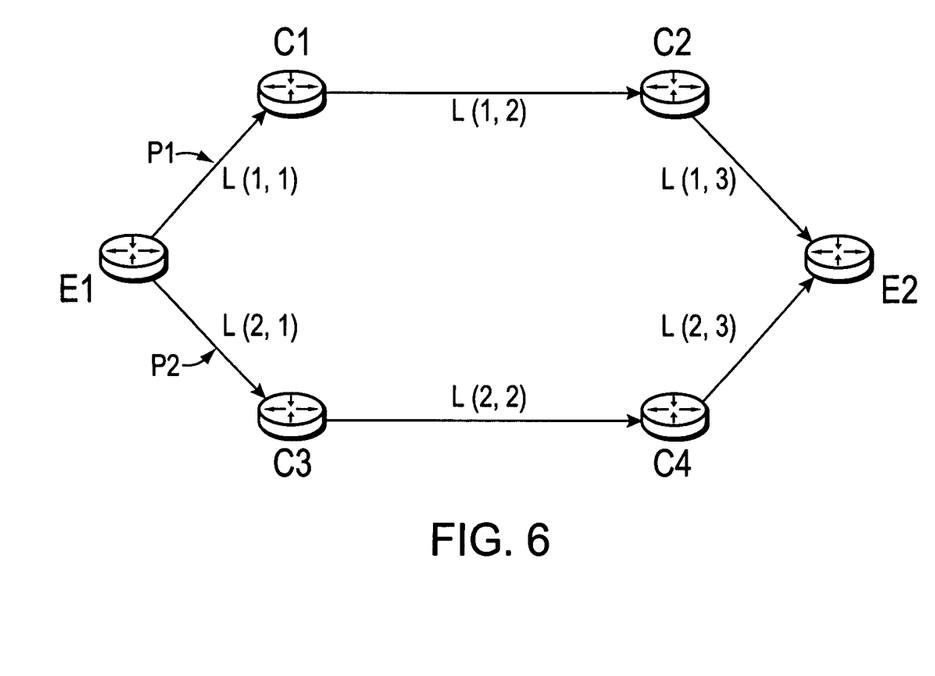
FIG. 6 is schematic block diagram of an exemplary computer network with a set of multiple equal-cost paths in accordance with the present invention.

Once the optimization is triggered, the head-end LSR E1 identifies the set (n) of equal-cost paths (P1-Pn) to the tail-end LSR E2. FIG. 6 is schematic block diagram of an exemplary computer network with a set of multiple equal-cost paths (such as in FIGS. 1 and 4A-B) in accordance with the present invention. With the reappearance of the previously failed link C1-C2, the original equal-cost paths are again available, denoted here as first and second paths P1 and P2. The head-end LSR E1 also identifies the distinct links along each path. For example, assume that there are a number "k" of links for each path, P(i), such that the links of each path are denoted as "L(i, 1)-L(i, k)." For instance, links along path P1 would be L(1, 1), L(1, 2), and L(1, 3), while those along P2 would be L(2, 1), L(2, 2), and L(2, 3). For explanation, the complete set of links for each path is represented herein as the following array format: P(i)[1, 2, . . . , k], such that, in the illustrative example described herein, the links of P1 and P2 are denoted as P1[1, 2, 3] and P2[1, 2, 3]. Notably, the specific links of the illustrative example are P1[E1-C1, C1—C2, C2-E2] and P2[E1-C3, C3-C4, C4-E2], respectively. It will be understood by those skilled in the art that the number (k) of links on each path need not be equal in order to have a set of equal-cost paths, and that the links shown herein are merely for illustration.

The LSR determines the link values learned, e.g., from IGP Advertisements 300, for each link along each path signifying the link availability. Notably, the link values may be embodied as the number of unconstrained TE-LSPs on the link, the amount of available bandwidth on the link, or the percent of total available bandwidth already in use on the link. Illustratively, for OSPF and IS-IS networks, the link values are transmitted in TE Extensions for each protocol, which are described in more detail in above-incorporated RFC 3784 (IS-IS) and RFC 3630 (OSPF). Specifically, the IGP Advertisement 300 may include the "extended IS reachability TLV" (IS-IS TLV Type 22) for the IS-IS link state packet, or for OSPF, the IGP Advertisement 300 may be embodied as the "Traffic Engineering LSA" (OSPF Opaque LSA type 9, 10, or 11, depending on flooding scope). Those skilled in the art will understand that other network protocols and IGP advertisement types may be used in accordance with the present invention, and that OSPF and IS-IS are merely representative.

Within the IGP Extension Object 500 of the IGP Advertisement 300 (for both IS-IS and OSPF), a number of sub-TLVs 550 are used to transmit link values to be stored on the TE Database 246 of the head-end LSR in accordance with the present invention. For example, the "Maximum (Link) Bandwidth" sub-TLV (OSPF type 6, IS-IS type 9) specifies the maximum bandwidth that can be used on a particular link. Also, the "Maximum Reservable (Link) Bandwidth" sub-TLV (OSPF type 7, IS-IS type 10) specifies the maximum bandwidth that may be reserved on the particular link. Further, the "Unreserved Bandwidth" sub-TLV (OSPF type 8, IS-IS type 11) specifies the amount of bandwidth not yet reserved on the particular link. Notably, to determine the percent of total available bandwidth already in use on the link, various combinations/ratios of the above link values may be used, such as the ratio of maximum reservable bandwidth to the maximum bandwidth.

To transmit the number of unconstrained TE-LSPs on a particular link, the present invention introduces a new sub-TLV (with a new type value for type field 555) for the set of sub-TLVs 550 carried within the IGP Extension Object 500. The length (for length field 560) of the new sub-TLV may be variable, or it may be configured as a fixed length, such as, e.g., 32 bits. The payload in the value field 565 contains the total number of unconstrained TE-LSPs on that particular link. Notably, the present invention also introduces a new criterion to trigger the flooding of an IGP Advertisement 300 containing the novel sub-TLV with the number of unconstrained TE-LSPs based on a change in the number. Illustratively, such a criterion may exist when the number varies by more than a configurable amount (e.g., 20%) within a configurable length of time (e.g., 10 mins.). Other means for triggering the flooding of an IGP Advertisement based on the number of unconstrained TE-LSPs will be understood by those skilled in the art. Notably, those skilled in the art will also understand that the link values described herein are representative examples, and that other known values may be advantageously used in accordance with the present invention.

Once each link value is determined, the LSR compares the links with the least availability on each path with those of each other path and, if necessary, reroutes (or routes) the TE-LSP over the path with the higher link availability (e.g., by a configurable amount), thereby load balancing the TE-LSPs. For example, assume that in FIG. 6, a TE-LSP is currently established over path P2, and the paths P1 and P2 have available bandwidth on each link of P1[20 MB, 30 MB, 15 MB] and P2[20 MB, 40 MB, 10 MB]. Here, the links on each path with the least availability (i.e., the least available bandwidth) are the third links (15 MB and 10 MB, respectively). The head-end LSR (E1) determines whether the least available link of the current path P2 (10 MB) is less available (i.e., has less available bandwidth) than the least available link of the other possible path P1 (15 MB) by a configurable amount (e.g., 10%). In this instance, 15 MB of availability is more than 10% greater than 10 MB, so E1 reroutes the current TE-LSP over P1. (Note that the bandwidth comparison does not differentiate between numbers of TE-LSPs already existing over the links, e.g., whether there are 10 LSPs at 1 MB each (10 MB) or 1 LSP at 10 MB, but instead only on the total available bandwidth.) Optionally, the head-end LSR may compute and compare the link values as though the TE-LSP has been rerouted to the new path before locating the link with the least link availability. For instance, if in the previous example the TE-LSP to be rerouted was a 10 MB TE-LSP, after its rerouting, the new link values for each of the least available links become 5 MB for P1 (15 MB−10 MB for new TE-LSP) and 20 MB for P2 (10 MB+10 MB for removal of TE-LSP). In effect, the rerouting in this situation has worsened the load balancing of the network. Had the head-end node compared the resulting link values after the rerouting (5 MB and 20 MB), the 10 MB TE-LSP would remain on the current path, P2.

As another example, assume that in FIG. 6, a TE-LSP is still currently established over path P2, but now the paths have a number of unconstrained TE-LSPs on each link of P1[15, 100, 35] and P2[15, 45, 25]. Here, the links on each path with the least availability (i.e., the highest number of unconstrained TE-LSPs) are the second links (100 and 45 respectively). The head-end LSR (E1) determines whether the least available link of the current path P2 (45) is less available (has a greater number) than the least available link of the other possible path P1 (100) by a configurable amount (e.g., 0%, notably a possible configurable value). In this instance, 100 unconstrained TE-LSPs are greater than 45, so E1 does not reroute the current TE-LSP, which remains on P2. Notably, the number of unconstrained TE-LSPs over a link may be normalized with respect to the overall "size" of the link, e.g., by using known normalization methods. For instance, 100 unconstrained TE-LSPs over a 2.5 GB bandwidth link may be configurably less than 45 unconstrained TE-LSPs over a 1 GB bandwidth link, e.g., 100/2.5 GB (40) is less than 45/1 GB (45). Other normalization methods may be used with the present invention, and the simple ratio of the number of unconstrained TE-LSPs to the total link bandwidth is merely to be taken as an example. Those skilled in the art will understand that other link values, such as the percent of available bandwidth, as well as any combination of link values, may be also examined, and that other computations or equations may be used advantageously to compare link values to thereby load balance TE-LSPs in accordance with the present invention.

In the rerouting computations above, the head-end LSR may trigger rerouting by first initiating a random-length timer to jitter the rerouting of the TE-LSP, where the timer is between zero seconds and a configurable maximum time limit. Upon expiration of the timer, the head-end LSR reconsiders the previous conditions to determine whether to invalidate the previous rerouting decision, e.g., based on whether other head-end LSRs have rerouted TE-LSPs over one or more links along the new selected path. If no substantial changes have occurred in the network, the head-end LSR then reroutes the TE-LSP. Notably, this reconsideration may be performed in a manner requiring less time to compute than the original reconsideration. For instance, the reconsideration may be configured to only determine whether conditions have changed, such as by checking the TED 246 for changed links (e.g., by a simple comparison of the number of TE-LSPs over the links for a configurable increase, or by checking the status of a flag, not shown, indicating a change). By jittering the rerouting of the TE-LSP, the LSR avoids contributing to a sudden increase or "burst" of reroutes and consequently network oscillations (e.g., caused when all head-end LSRs reroute their TE-LSPs to the same link at substantially the same time, which would then no longer be the optimal or load balanced path, resulting in a reroute again, etc.).

Figure 7:
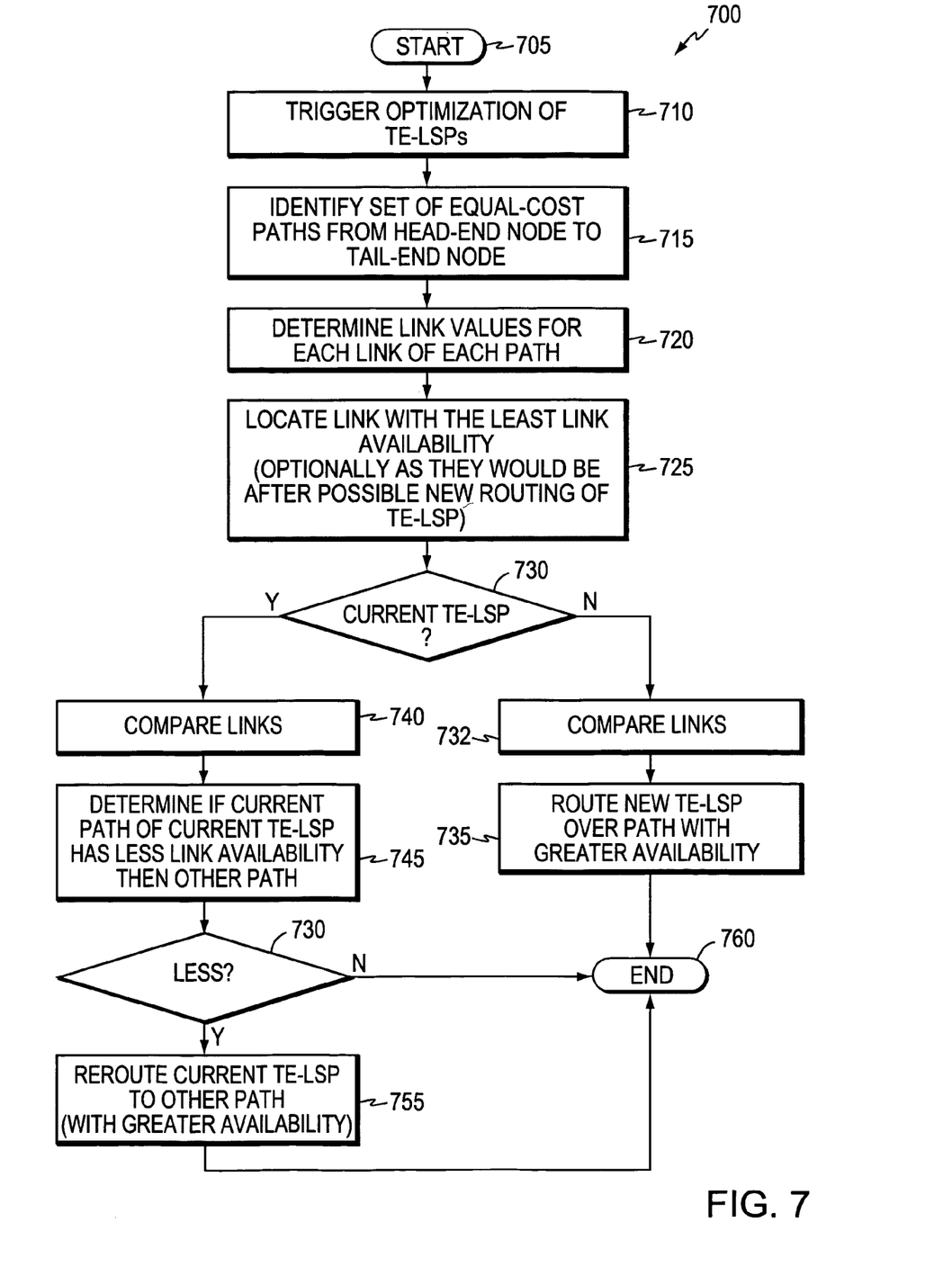
FIG. 7 is a flowchart illustrating a sequence of steps for load balancing TE-LSPs in accordance with the present invention.

FIG. 7 is a flowchart illustrating a sequence of steps for load balancing TE-LSPs in accordance with the present invention. Sequence 700 starts at step 705 and continues to step 710 where optimization of TE-LSPs is triggered, such as through a timer-based or event-driver trigger, as described above. In step 715 the head-end LSR identifies for each of its TE-LSPs the set of equal-cost paths that are available from itself (the head-end node) to the tail-end node. In step 720, using information from its TED, the head-end LSR determines link values for each link of each path, such as the number of unconstrained TE-LSPs, amount of available bandwidth, etc. Next, the head-end LSR locates the link on each path that has the least link availability in step 725, e.g., the link with the highest number of unconstrained TE-LSPs, or the least amount of available bandwidth, etc. Optionally, the head-end LSR may first compute the link values as though the TE-LSP has been rerouted to the new path before locating the link with the least link availability, as described above.

If at step 730 the TE-LSP is not a current TE-LSP (i.e., it is a new TE-LSP), the links of each path with the least availability are compared at step 732, and the new TE-LSP is routed over the path with the greater availability at step 735. The sequence then ends in step 760. If, however, at step 730 the TE-LSP is a current TE-LSP (i.e., already exists on one path), the links compared at step 740, and the head-end LSR determines in step 745 whether the current path of the current TE-LSP has less link availability than another path. If not, in step 750, the sequence ends at step 760. If the current path does have a link with less availability, however, the head-end LSR triggers reroute of the current TE-LSP from the current path to the other path (with greater link availability) in step 755, thereby load balancing the TE-LSPs. Notably, as described above, the reroute of the current TE-LSP (or the routing of a new TE-LSP) may be jittered. The sequence then ends at step 760.

Advantageously, the novel technique efficiently load balances TE-LSPs, including unconstrained TE-LSPs, over multiple paths from a head-end node to a tail-end node based on the link availability (most restrictive link value) of each link along the multiple paths. By comparing the link availability of each path, the inventive technique provides a mechanism for efficiently load balancing the TE-LSPs across equal-cost paths. This is particularly advantageous in the case where previously load balanced TE-LSPs have been rerouted due to a network element failure, and optimizing those rerouted TE-LSPs when the network element is restored, strictly based on path cost, would not result in a reversion to the previous, e.g., load balanced, path.

While there has been shown and described an illustrative embodiment that load balances TE-LSPs at a head-end node of the TE-LSP, it is to be understood that various other adaptations and modifications may be made within the spirit and scope of the present invention. For example, while the above description describes performing the technique at the head-end LSR, the invention may also be advantageously used with PCEs. Notably, the invention has been shown and described herein using nomenclature such as "optimizing," which may appear to be specific to implementations of the invention providing re-optimization and load balancing of an established TE-LSP (such as, e.g., after implementing MPLS FRR). However, the invention in its broader sense is not so limited, and may, in fact, be used to optimize and load balance new TE-LSPs.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for efficiently load balancing a traffic engineering (TE) label switched path (LSP) from a head-end node to a tail-end node of a computer network, the method comprising:
    detecting an optimization trigger; identifying a set of two or more paths with equal costs from the head-end node to the tail-end node, the set of two or more paths with equal costs including a current path of the TE-LSP, and a different path not currently utilized by the TE-LSP, each path of the set of two or more paths with equal costs having one or more associated links;
    determining a link value for each link of each path of the set of two or more paths with equal costs, the link value signifying availability of the link;
    comparing the link values of the links having a least availability for each path with equal cost;
    determining that the link having the least availability on the current path of the set of two or more paths with equal costs has less availability than the link having the least availability on the different path of the set of two or more paths with equal costs; and
    rerouting the TE-LSP, from the current path of the set of two or more paths with equal costs, to be over the different path of the set of two or more paths with equal costs, that includes the link having a greater availability, of the links having the least availability for each path with equal cost; and
    jittering the step of rerouting the TE-LSP by delaying for a randomly selected period of time.

2. The method as in claim 1, further comprising: comparing the link values again after delaying in order to determine over which path to route the TE-LSP.

3. The method as in claim 1, wherein the link values are selected from a group consisting of: a number of unconstrained TE-LSPs on the link, an amount of available bandwidth on the link, and a percent of total available bandwidth already in use on the link.

4. The method as in claim 1, further comprising: learning the link values from Interior Gateway Protocol (IGP) Advertisements.

5. The method as in claim 1, further comprising: comparing the link value of the links having the least availability for each path with equal cost as though the TE-LSP has been rerouted.

6. The method as in claim 1, further comprising: normalizing the link values prior to the step of comparing.

7. The method as in claim 1, further comprising: repeating the steps of identifying, determining a link value for each link, comparing, determining that the link having the least availability, and rerouting for a set of TE-LSPs.

8. The method as in claim 1, wherein the link value for each link comprises a number of unconstrained TE-LSPs on the link.

9. A system for efficiently load balancing a traffic engineering (TE) label switched path (LSP) of a computer network having links, the system comprising:
    one or more label-switched routers (LSRs) configured to advertise link values for the links of the computer network, each link value signifying availability of the link;
    a head-end LSR of the TE-LSP configured to receive the advertised link values, the head-end LSR further configured to i) detect an optimization trigger, ii) identify a set of two or more paths with equal costs from the node to a tail-end node, the set of two or more paths with equal costs including a current path of the TE-LSP, and a different path not currently utilized by the TE-LSP, each path of the set of two or more paths with equal costs having one or more associated links, iii) determine the link value for each link of each path of the set of two or more paths with equal costs, iv) compare the link value of the links having a least availability for each path with equal cost, v) determine that the link having the least availability on the current path of the set of two or more paths with equal costs has less availability than the link having the least availability on the different path of the set of two or more paths with equal costs, vi) reroute the TE-LSP, from the current path of the set of two or more paths with equal costs, to be over the different path of the set of two or more paths with equal costs, that includes the link having a greater availability, of the links having the least availability for each path with equal cost, and vii) jitter the reroute by delaying for a randomly selected period of time.

10. The system as in claim 9, wherein the link values are selected from a group consisting of: a number of unconstrained TE-LSPs on the link, an amount of available bandwidth on the link, and a percent of total available bandwidth already in use on the link.

11. The system as in claim 9, further comprising: Interior Gateway Protocol (IGP) Advertisements to advertise the link values.

12. The system as in claim 9, wherein the link values comprise a number of unconstrained TE-LSPs on each of the links.

13. An apparatus for efficiently load balancing a traffic engineering (TE) label switched path (LSP) from a head-end node to a tail-end node of a computer network, the apparatus comprising:
  means for detecting an optimization trigger;
  means for identifying a set of two or more paths with equal costs from the head-end node to the tail-end node, the set of two or more paths with equal costs including a current path of the TE-LSP, and a different path not currently utilized by the TE-LSP, each path of the set of two or more paths with equal costs having one or more associated links;
  means for determining a link value for each link of each path of the set of two more paths with equal costs, the link value signifying availability of the link;
  means for comparing the link value of the links having a least availability for each path with equal cost;
  means for determining that the link having the least availability on the current path of the set of two or more paths with equal costs has less availability than the link having the least availability on the different path of the set of two or more paths with equal costs;
  means for rerouting the TE-LSP, from the current path of the set of two or more paths with equal costs, to be over the different path of the set of two or more paths with equal costs, that includes the link having a greater availability, of the links having the least availability for each path with equal cost; and
  means for uttering the rerouting by delaying for a randomly selected period of time.

14. A node for efficiently load balancing a traffic engineering (TE) label switched path (LSP) of a computer network, the computer network having links, the node comprising:
  a network interface to receive advertisements with link values for the links of the computer network, the link value signifying the availability of the link;
  a processor coupled to the network interface and configured to execute software processes; and
  a memory configured to store a Traffic Engineering (TE) process executable by the processor, the TE process configured to i) detect an optimization trigger, ii) identify a set of two or more paths with equal costs from the node to a tail-end node, the set of two or more paths with equal costs including a current path of the TE-LSP, and a different path not currently utilized by the TE-LSP, each path of the set of two or more paths with equal costs having one or more associated links, iii) determine the link value for each link of each path of the set of two or more paths with equal costs, iv) compare the link value of the links having a least availability for each path with equal cost, v) determine that the link having the least availability on the current path of the set of two or more paths with equal costs has less availability than the link having the least availability on the different path of the set of two or more paths with equal costs, vi) reroute the TE-LSP, from the current path of the set of two or more paths with equal costs, to be over the different path of the set of two or more paths with equal costs, that includes the link having a greater availability, of the links having the least availability for each path with equal cost, and vii) jitter the reroute by delaying for a randomly selected period of time.

15. The node as in claim 14, wherein the node is a path computation element (PCE).

16. The node as in claim 14, wherein the node is a head-end label-switched router (LSR).

17. The node as in claim 14, wherein the link value comprises a number of unconstrained TE-LSPs on the link.

18. A method comprising:
  detecting an optimization trigger;
  identifying a set of two or more paths with equal costs from a head-end node to a tail-end node in a computer network, the set of two or more paths with equal costs including a current path of a traffic engineering (TE) label switched path (LSP) from the head-end node to the tail-end node, and a different path not currently utilized by the TE-LSP, each path of the set of two or more paths with equal costs having one or more associated links;
  ascertaining a number of unconstrained TE-LSPs on each link of each path of the set of two or more paths with equal costs;
  comparing the number of unconstrained TE-LSPs on links having a least availability of each path of the set of two or more paths with equal costs;
  determining that a link having the least availability on the current path of the set of two or more paths with equal costs is supporting a greater number of unconstrained TE-LSPs than a link having the least availability on the different path of the set of two or more paths with equal costs; and
  in response to the determining, rerouting the TE-LSP from the current path of the set of two or more paths with equal costs to be over the different path of the set of two or more paths with equal costs.

19. The method of claim 18, further comprising:
  normalizing the number of unconstrained TE-LSPs on each link with respect to a size of the link prior to comparing the number of unconstrained TE-LSPs.

20. The method as in claim 18, wherein the ascertaining further comprises:
learning the number of unconstrained TE-LSPs on each link of each path of the set of two or more paths with equal cost from Interior Gateway Protocol (IGP) advertisements.

21. The method as in claim 18, further comprising:
jittering the rerouting by delaying for a randomly selected period of time.

22. The method as in claim 18, further comprising:
repeating the steps of identifying, ascertaining, comparing, determining, and rerouting for a set of multiple TE-LSPs.

23. An apparatus comprising:
a network interface to receive advertisements with link values for links of a computer network, each link value indicating a number of unconstrained traffic engineering (TE) label switched paths (LSPs) on a link;
a processor coupled to the network interface and configured to execute software processes; and
a memory configured to store a TE process executable by the processor, the TE process configured, when executed, to
detect an optimization trigger,
identify a set of two or more paths with equal costs, the set of two or more paths with equal costs including a current path of a TE-LSP, and a different path not currently utilized by the TE-LSP, each path of the set of two or more paths with equal costs having one or more associated links,
ascertain from the received advertisements a number of unconstrained TE-LSPs on each link of each path of the set of two or more paths with equal costs,
compare the number of unconstrained TE-LSPs on links having a least availability of each path of the set of two or more paths with equal costs,
determine that a link having the least availability on the current path of the set of two or more paths with equal costs is supporting a greater number of unconstrained TE-LSPs than a link having the least availability on the different path of the set of two or more paths with equal costs, and
reroute the TE-LSP from the current path of the set of two or more paths with equal costs to be over the different path of the set of two or more paths with equal costs.

24. The apparatus of claim 23, wherein the TE process is further configured, when executed, to normalize the number of unconstrained TE-LSPs on each link with respect to a size of the link prior to comparison of the number of unconstrained TE-LSPs.

25. The apparatus of claim 23, wherein the received advertisements are Interior Gateway Protocol (IGP) advertisements.

26. The apparatus of claim 23, wherein the TE process is further configured, when executed, to jitter the reroute by delay for a randomly selected period of time.

27. The apparatus of claim 23, wherein the TE process is further configured, when executed, to repeat the operations to identify, ascertain, compare, determine, and reroute for a set of multiple TE-LSPs.

* * * * *